United States Patent [19]

Toberg

[11] Patent Number: 4,858,660
[45] Date of Patent: Aug. 22, 1989

[54] SELF CLEANING WOOD INCISOR

[76] Inventor: Lloyd H. Toberg, 11120 SW. Industrial Way, Tualatin, Oreg. 97062

[21] Appl. No.: 291,260

[22] Filed: Dec. 28, 1988

[51] Int. Cl.$^4$ ............................................... B27M 1/02
[52] U.S. Cl. .................... 144/2 J; 144/362; 83/867
[58] Field of Search ................ 144/7 R, 2 J, 2 K, 41, 144/361, 362; 83/867

[56] References Cited

U.S. PATENT DOCUMENTS

| | | | |
|---|---|---|---|
| 2,684,089 | 7/1954 | Graham et al. | 144/2 J |
| 4,706,722 | 11/1987 | Silcox | 144/2 J |

FOREIGN PATENT DOCUMENTS

| | | | |
|---|---|---|---|
| 728158 | 4/1932 | France | 144/2 J |

*Primary Examiner*—W. Donald Bray
*Attorney, Agent, or Firm*—Chernoff, Vilhauer, McClung & Stenzel

[57] ABSTRACT

An apparatus for applying perforations to wood surfaces is disclosed. The apparatus includes a drum having interspaced incisor rings mounted thereto and a plurality of cleaning members for removing wood residues from the incisor ring teeth. Each cleaning member projects into a space between adjacent incisor rings and is irrotatably secured to the mounting platform of the apparatus. The rotation of the incisor rings relative to the fixed positioning of the cleaning members brings the side surfaces of the teeth into progressive engagement with the adjoining side surfaces of cleaning members creating a scissor action across the teeth surfaces which effectively removes wood residues from the teeth. The apparatus provides for the removal of wood residue away from the spacer rings located in the space between adjacent incisor rings using cleaning members having tapered projections for directing such residue into pockets defined therein. The invention also allows for the removal of individual cleaning members for repair or replacement witout disengaging the remaining cleaning members associated with that drum.

20 Claims, 4 Drawing Sheets

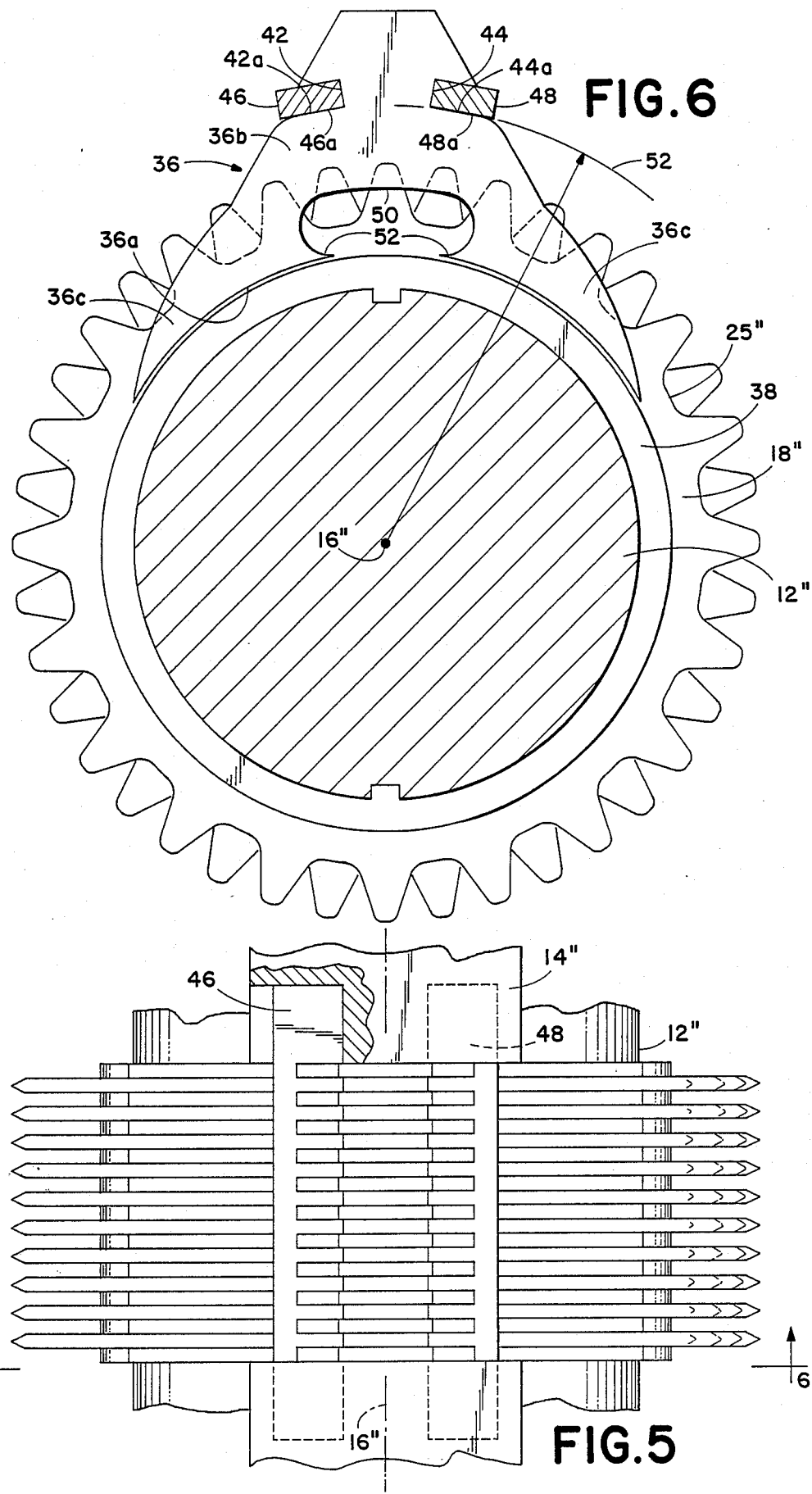

SELF CLEANING WOOD INCISOR

BACKGROUND OF THE INVENTION

The present invention relates to an apparatus for forming perforations in the surfaces of wood beams as a preliminary step to the application of preservatives to the beams so as to improve absorption of the preservative by the wood, and in particular to the cleaning of the rotary drum wood incisors used in forming such perforations to prevent the accumulation of material between the incisor teeth.

The process of treating rough lumber with a selected preservative typically includes a preparatory step involving the perforation of the wood surfaces by sets of paired drums having outwardly protruding cutting teeth as taught, for example, in Toberg U.S. Pat. No. 4,137,956, the disclosure of which is hereby incorporated by reference. The teeth of such devices are located around the periphery of a plurality of incisor rings which are separated from one another by one or more spacer rings. In operation the space between these teeth becomes clogged with pitch, wood slivers and similar debris which interferes with the desired penetration of the teeth into the wood surface. Wood incisors of the prior art, such as that shown in Silcox U.S. Pat. No. 4,706,722, teach the use of a rotatable and freely-radially movable annular cleaning ring which surrounds each spacer ring and has an outside diameter which is at least equal to the outside diameter of the incisor ring plus the height of a tooth. In such prior art arrangements, when the teeth penetrate the wood surface the periphery of the cleaning ring is forced to project beyond the periphery of a segment of the incisor ring opposite the side of engagement with the wood. The effect is to push any accumulated substances outwardly from the teeth on this segment of the incisor ring periphery.

Such prior art devices employing sliding cleaning rings frequently fail to operate as a result of the accumulation of pitch and other debris on the cleaning rings which prevents them from moving radially. Also, such devices require replacement of the cleaning rings with rings of an alternative size when employing incisor rings with different sized teeth so as to maintain the correct functional projection of the cleaning rings beyond the periphery of the teeth. Such prior art devices also require cleaning rings fabricated from relatively expensive lower friction metals.

Therefore, a need exists for an apparatus for performing perforations on wood surfaces having a cleaning mechanism which will operate satisfactorily with a surface build-up of pitch and similar wood debris and which can be used in conjunction with a wide range of incisor rings having a variety of teeth sizes.

SUMMARY OF THE INVENTION

The present invention eliminates the need for frequent cleaning of a rotating drum wood incisor and its cleaning mechanism by fixedly attaching the cleaning mechanism to the platform which supports the incisor drum so as to be irrotatable with respect to the drum thereby eliminating the sliding action of prior art cleaning rings, which action is subject to clogging and fouling by wood residues. The subject invention can also be used in conjunction with a wide range of replacement teeth sizes by virtue of the fixed attachment of the cleaning member to the platform, and causing it to extend radially beyond the periphery of any mountable incisor ring.

A preferred embodiment of the wood incisor comprises a mounting platform having a drum rotatably journaled thereon. A plurality of annular incisor rings having radially projecting teeth are mounted along the axis of the drum each being separated from adjoining incisor rings by one or more annular spacer rings. A plurality of irrotatable cleaning members are mounted to the platform so as to project into the separation between adjacent incisor rings and to overlie all or a portion of the periphery of the spacer rings therebetween. Each cleaning member may include a pocket defined therein which opens onto a respective one or more spacer rings so as to provide a path through which the wood residue can be cleared away from the spacer rings. The cleaning rings may also include tapered projections which are oriented between the pockets and annular spacer rings and which face in a direction opposed to the rotation of the drum so as to direct wood residue into the pockets and away from the spacer rings.

The present invention also provides for a platform having a pair of retainer bars which are received by opposing slots on each cleaning member for attaching each cleaning member individually to the platform. One of these bars may be made removable so as to allow for the release of one or more cleaning members for repair or replacement without disengaging the remaining cleaning members associated with that drum. The engagement and removal of the cleaning members from the retaining bars is facilitated by making the radially inward edge of each slot substantially tangent to an arc having its center at the axis of rotation of the drum at the point of engagement between the retainer bar and the respective lot. Once the cleaning members are secured by the retainer bars, the cleaning members are irrotatable with respect to the drum thereby retaining their functional positioning irrespective of fouling due to accumulated residue.

Accordingly, it is a principal object of the present invention to provide a wood incisor which continuously removes accumulated wood segments and pitch from the teeth without the need for frequent servicing and cleaning of the cleaning mechanism to maintain the desired cleaning action.

It is a further object of the present invention to provide such a cleaning apparatus which can be used with a wide variety of annular incisors of varying tooth diameters and thickness.

It is a further object of the present invention to provide a cleaning mechanism which can be fabricated from any hard material and thereby not limited to higher cost, lower friction metals.

It is a further object of the present invention to provide such an apparatus having a cleaning mechanism with sufficient adjustability as to be attached to the platform in a wide range of angular positions.

It is a yet further object of the present invention to provide such a cleaning apparatus having cleaning members which are easily and individually removable for repair or replacement.

The foregoing and other objectives, features and advantages of the present invention will be more readily understood upon consideration of the following detailed description of the invention taken in conjunction with the accompanying drawings.

BRIEF DESCRIPTION OF THE DRAWINGS

FIG. 5 is a fragmented side view of an alternate embodiment of a wood incisor of the present invention.

FIG. 6 is a sectional view taken along line 6—6 of FIG. 5.

DETAILED DESCRIPTION OF THE INVENTION

Figure 2:
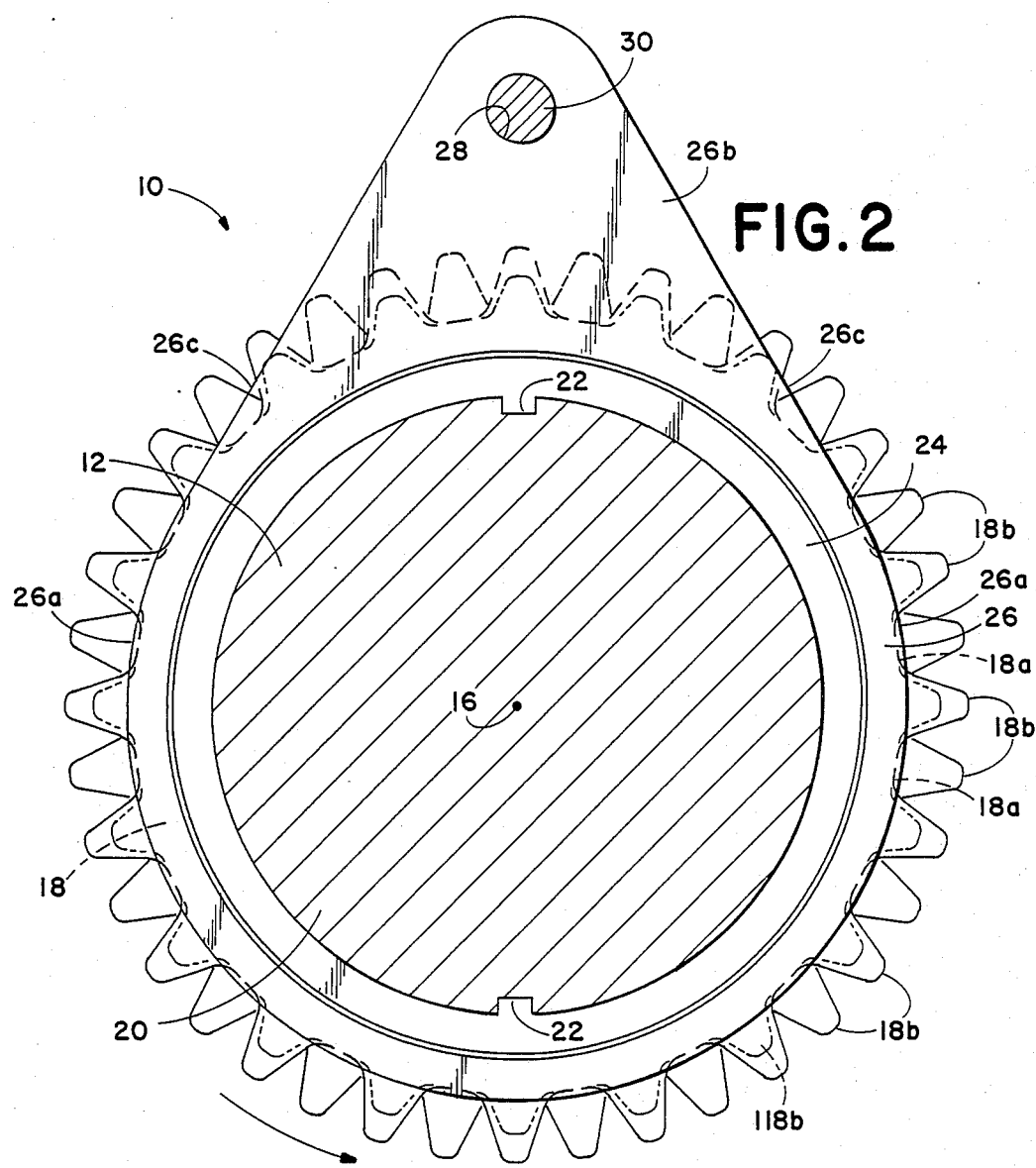
FIG. 2 is a sectional view taken along line 2—2 of FIG. 1.
Figure 1:
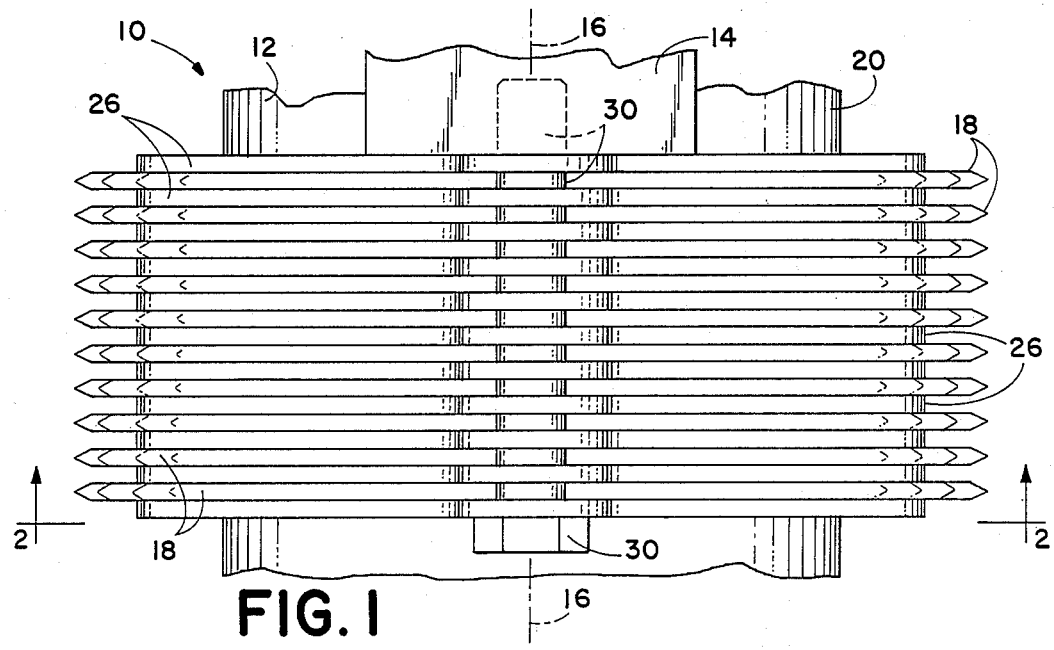
FIG. 1 is a fragmented side view of an exemplary embodiment of a wood incisor of the present invention.

Referring to the drawings, wherein like numerals refer to the same elements, and in particular to FIGS. 1 and 2, a preferred embodiment of the present invention is shown as comprising a wood incisor 10 for forming a plurality of spaced perforations on the outer surface of a piece of wood in preparation for the application of preservatives to the wood. The incisor 10 comprises a drum 12 which is rotatably journaled on a mounting platform 14 for rotation about a longitudinal axis of rotation 16. A plurality of annular incisor rings 18 are sized to fit snugly over the drum core 20 and are keyed to engage keyways 22 so as to secure the rings 18 for rotation therewith. The incisor rings 18 are interspaced with one or more annular spacer rings 24 which are similarly keyed and also fit snugly over the core 20. The spacer rings 24 have a diameter which is less than the diameter of the incisor rings 18 at troughs 18a.

One of a plurality of annular cleaning rings 26 surrounds those spacer rings 24 which are sandwiched between adjoining incisor rings 18. The periphery 26a of each cleaning ring 26 does not project substantially beyond the troughs 18a between the teeth 18b of the incisor rings 18 with the exception of a radially extending cleaning segment 26b, which has an aperture 28 extending therethrough. The cleaning rings 26 are irrotatably secured to the mounting platform 14 by a retainer rod 30, shown in FIG. 1 as a bolt, which simultaneously engages the aligned apertures 28 of the of cleaning rings 26 and fixedly engages the mounting platform 14.

In operation, the drum 12 is driven so as to rotate about its longitudinal axis 16 thereby rotating the incisor teeth 18b. A board or other wood segment to be perforated is then passed across the drum at a lineal speed substantially matching the angular displacement of the teeth 18b so as to penetrate the wood with the teeth. Wood residue, including pitch and wood segments, which adhere to the teeth as a result of the engagement between the board or other wood segment and the teeth, is removed as the rotation of the incisor rings 26 brings the side surfaces of the teeth 18b into progressive engagement with the side surfaces of the projecting segments 26b of the cleaning rings 26. The inclined edges 26c of the projecting segments 26b create a substantially radially outward scissor action across the adjacent teeth surfaces so as to push accumulated debris away from the incisor rings 18. The cleaning rings 26 maintain their functional positioning when incisor rings with different sized teeth, such as teeth 118b in FIG. 2, are employed.

Figure 4:
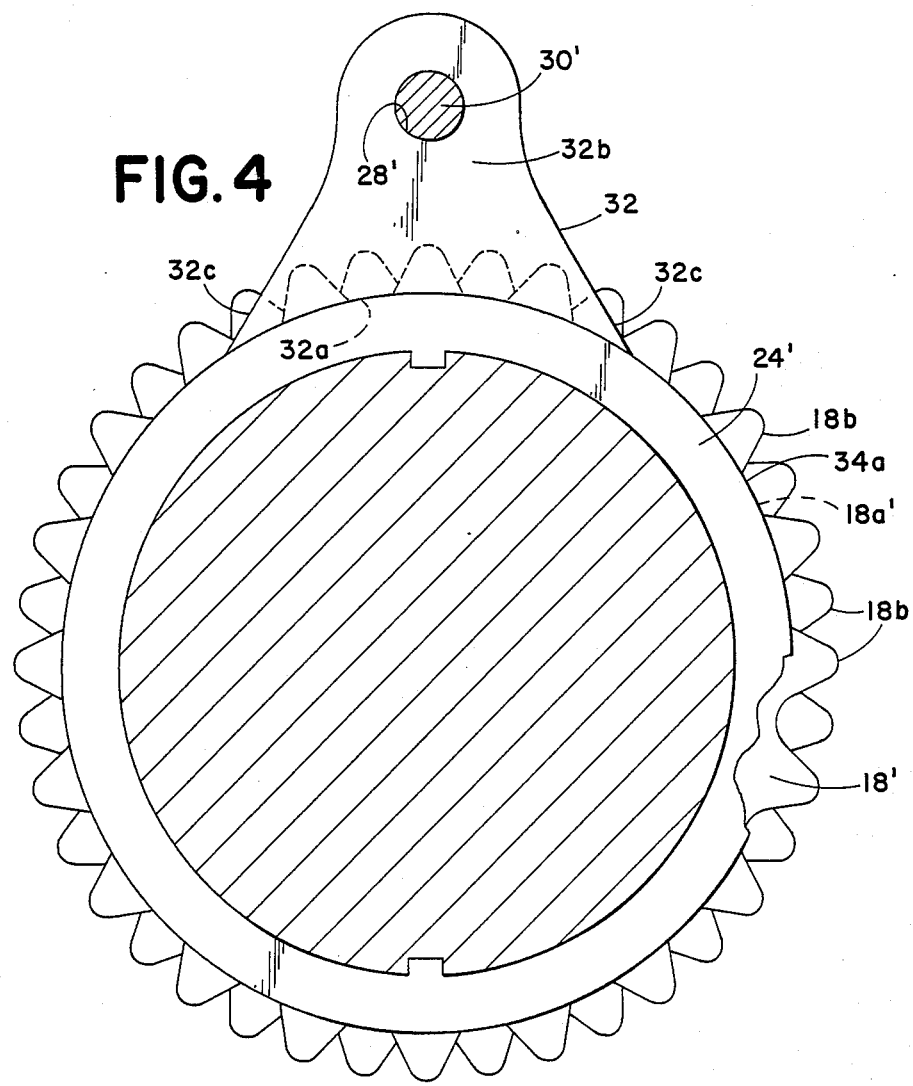
FIG. 4 is a sectional view taken along line 4—4 of FIG. 3.
Figure 3:
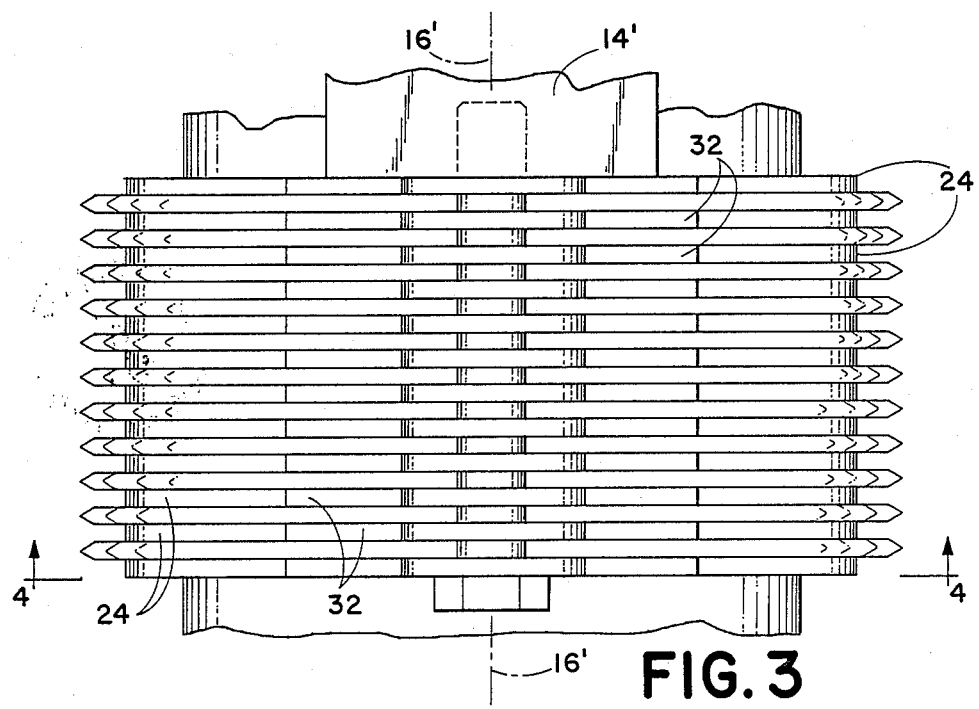
FIG. 3 is a fragmented side view of a first alternative embodiment of a wood incisor of the present invention.

A first alternative embodiment of the present invention is shown in FIGS. 3 and 4 wherein the cleaning members are comprised of a cleaning portion 32 having an arcuate edge 32a arranged to matingly overlie a portion of the periphery of one or more spacer rings 24'. The cleaning portion 32 includes an elongate segment 32b which projects radially beyond the periphery of the incisor rings 18' and has an aperture 28' extending therethrough for engagement with the retainer rod 30'. This embodiment of the invention is used with wood incisors which have spacer rings with a diameter which is substantially equal to the diameter of the incisor rings 18 at the troughs 18a'.

The cleaning action performed by the cleaning members of this embodiment of the invention is substantially the same as that previously described for cleaning rings 26 of FIGS. 1 and 2 with the exception of a reduced radially outward force component created by the scissor action between the teeth edges and the less graduated slope of the cleaning member edge 32c.

A second alternative embodiment of the present invention is shown in FIGS. 5 and 6 wherein the cleaning members are comprised of a cleaning portion 36 having an arcuate edge 36a arranged to substantially overlie a portion of the periphery of one or more spacer rings 38. The cleaning portion 36 includes an elongate segment 36b which projects radially beyond the periphery of the incisor rings 18". The segment 36b further includes opposing rectangular slots 42, 44 defined therein for receiving and engaging elongate retainer bars 46, 48, respectively. The pair of retainer bars are fixedly secured to the mounting platform 14" adjacent to the drum 12" and parallel to the drum longitudinal axis of rotation 16". Preferably, at least one of the bars 48, in the embodiment illustrated, is removable so as to allow for the release of any one or more of the cleaning portions 36. Each of the cleaning portions has a pocket 50 defined therein which opens onto a respective one or more of the spacer rings 38. The cleaning portions 36 define tapered projections 52 which oppose a direction of rotation of the drum 12" so as to direct any debris impacted between the spacer rings 38 and the cleaning portion into the pocket 50. The cleaning portion 36 includes projecting segments 36c which are each tapered and oriented in confronting relation to a direction of rotation of the drum 12" around the axis 16". This embodiment of the invention is used with wood incisors which have spacer rings with a diameter which is less than the diameter of the incisor rings 18" at the trough 18a". The cleaning action performed by the cleaning members 36 of this embodiment of the invention is substantially the same as that previously described for cleaning members 32 of the first alternative of the embodiment of the invention.

Figure 8:
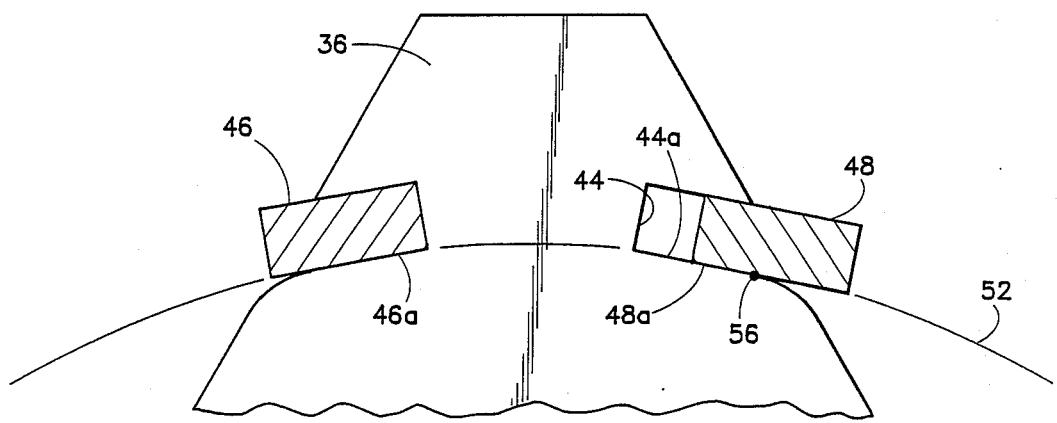
FIG. 8 is a fragmented top view of the wood incisor of FIG. 6 showing the full engagement of a cleaning member with a first retainer bar and the initial engagement with a second retainer bar.
Figure 7:
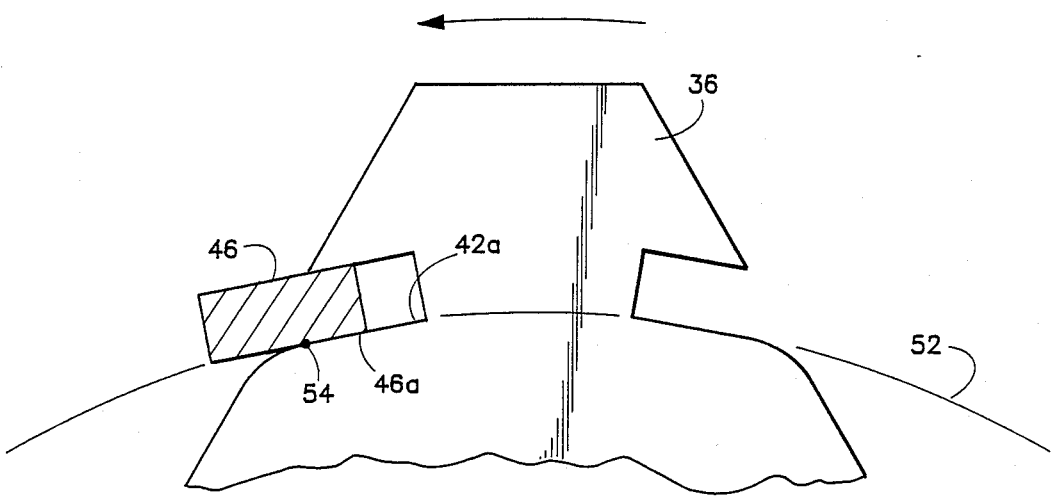
FIG. 7 is a fragmented top view of the wood incisor of FIG. 6 showing the initial engagement of a cleaning member with a first retainer bar.

The retainer bars 46, 48 each have an inwardly directed surface 46a, 48a which faces the axis of rotation 16". Referring now also to FIGS. 7 and 8, the surfaces 46a, 48a are substantially tangent to an arc 52 having its center at the axis 16" at the point 54, 56 where the retainer bar surface 46a, 48a first engages a respective slot surface 42a, 44a, respectively, when one of the cleaning elements is positioned to overly a respective spacer ring and is moved toward the retainer bar. FIG. 7 shows the retainer bar 46 and the point of first engagement 54 of the retainer bar surface 46a with the slot surface 42a as the cleaning element is moved toward the retainer bar 46. FIG. 8 shows the cleaning element 36 fully engaged to retainer bar 46 and the point of first engagement 56 of the retainer bar surface 48a with the slot surface 44a as the removable bar 48 is positioned to engage the slot 44. The bottom edge 42a, 44a of each slot 42, 44, respectively, is approximately tangent to the arc 52 when the cleaning element 36 is positioned to overlie its respective spacer rings 40.

The method of mounting the cleaning elements shown in FIGS. 2 and 4 using a single retainer rod is interchangeable with the method of mounting using dual retainer bars 46, 48 shown in FIG. 6, with the dual bar configuration having the advantage of allowing for the removable of one or more cleaning members for repair or replacement without disengaging the remaining cleaning members associated with that drum.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A wood incisor for forming a plurality of spaced perforations in the outer surface of a piece of wood preparatory to the preservative treatment of the wood comprising:
   (a) a mounting platform;
   (b) a drum, having an axis of rotation, rotatably journaled on said mounting platform;
   (c) a plurality of annular incisor rings mounted on said drum for rotation therewith, said incisor rings being interspaced along said axis of said drum;
   (d) a plurality of cleaning elements mounted to said platform so as to be irrotatable with respect to said drum, each of said cleaning elements projecting into a respective space between said incisor rings.

2. The apparatus of claim 1, including annular spacer rings which are mounted on said drum between said incisor rings.

3. The apparatus of claim 2 wherein each of said cleaning elements are comprised of an annular ring, each of said annular rings surrounding ne or more of said spacer rings.

4. The apparatus of claim 2 wherein each of said cleaning elements is comprised of an arcuate segment arranged to matingly overlie a portion of the periphery of one or more spacer rings and an elongate segment which projects radially beyond the periphery of said incisor rings for attachment to said mounting platform.

5. The apparatus of claim 4 wherein each of said cleaning elements has a pocket defined therein which opens onto a respective one or more of said spacer rings.

6. The apparatus of claim 5 wherein said cleaning elements define tapered projections which are opposed to the direction of rotation of said drum and which are located between said pockets and the respective spacer rings.

7. The apparatus of claim 4 wherein said arcuate segments are tapered and oriented in confronting relation to the direction of rotation of said drum.

8. The apparatus of claim 1 wherein said platform includes a pair of elongate rectangular retainer bars adjacent to said drum and parallel to said axis of rotation for fixedly attaching one or more of said cleaning elements to said platform.

9. The apparatus of claim 8 wherein each of said cleaning elements includes a pair of opposing rectangular slots for receiving and engaging said elongate retainer bars.

10. The apparatus of claim 9 wherein at least one of said bars is removable so as to allow for the release of one or more of said cleaning elements.

11. The apparatus of claim 9 wherein said elongate retainer bars each have an inwardly directed surface which faces said axis of rotation and is substantially tangent to an arc, having its center at said axis of rotation, at the point of engagement of said retainer bar with said slot when one of said cleaning elements is positioned to overlie a respective spacer ring and moved toward said retainer bar.

12. The apparatus of claim 11 wherein said slots each have a bottom edge nearest said axis of rotation which is approximately tangent to said arc when said cleaning element is positioned to overlie its respective spacer ring.

13. A wood incisor for forming a plurality of spaced perforations in the outer surface of a piece of wood preparatory to the preservative treatment of the wood comprising:
   (a) a mounting platform;
   (b) a drum, having an axis of rotation, rotatably journaled on said mounting platform;
   (c) a plurality of annular incisor rings mounted on said drum for rotation therewith;
   (d) annular spacer rings mounted on said drum between adjacent pairs of adjoining incisor rings;
   (e) cleaning rings associated with said spacer rings;
   (f) said cleaning rings having cleaning segments which project radially beyond the periphery of said incisor rings; and
   (g) means for securing said cleaning rings irrotatably to said mounting platform.

14. The apparatus of claim 13 wherein each of said cleaning rings has a pocket defined therein which opens onto a respective one or more of said annular spacer rings.

15. The apparatus of claim 14 wherein said cleaning rings define tapered projections which are opposed to the direction of rotation of said drum and which are located between said pockets and the respective annular spacer rings.

16. The apparatus of claim 13 wherein said mounting platform includes a pair of elongate rectangular retainer bars adjacent to said drum and parallel to said axis of rotation for fixedly attaching one or more of said cleaning rings to said platform.

17. The apparatus of claim 16 wherein each of said cleaning rings includes a pair of opposing rectangular slots for receiving and engaging said elongate retainer bars.

18. The apparatus of claim 17 wherein a least one of said bars is removable so as to allow for the release of one or more of said cleaning rings.

19. The apparatus of claim 17 wherein said elongate retainer bars each have an inwardly directed surface which faces said axis of rotation and is substantially tangent to an arc, having its center at said axis of rotation, at the point of engagement of said retainer bar with said slot when one of said cleaning elements is positioned for association with a respective spacer ring and moved toward said retainer bar.

20. The apparatus of claim 19 wherein said slots each have a bottom edge nearest said axis of rotation which is approximately tangent to said arc when said cleaning ring is positioned for association with a respective spacer ring.

* * * * *

UNITED STATES PATENT AND TRADEMARK OFFICE
CERTIFICATE OF CORRECTION

PATENT NO. : 4,858,660
DATED : August 22, 1989
INVENTOR(S) : Lloyd H. Toberg

It is certified that error appears in the above-identified patent and that said Letters Patent is hereby corrected as shown below:

Col. 2, line 35     Change "lot" to --slot--

Col. 3, line 52     Delete --of-- (second occurrence)

Col. 4, line 68     Change "overly" to --overlie--

Col. 5, line 18     Change "removable" to --removal--

Col. 5, line 49     Change "ne" to --one--

Col. 6, line 61     Change "a" to --at--

Signed and Sealed this

First Day of September, 1992

Attest:

DOUGLAS B. COMER

*Attesting Officer*     Acting Commissioner of Patents and Trademarks